United States Patent
Brenden et al.

(10) Patent No.: US 7,106,022 B2
(45) Date of Patent: Sep. 12, 2006

(54) VELOCITY CONTROLLED DISK DRIVE HEAD RETRACTION WITH OFFSET REMOVAL

(75) Inventors: Jason P. Brenden, Woodbury, MN (US); James A. Dahlberg, Eagan, MN (US)

(73) Assignee: Agere Systems Inc., Allentown, PA (US)

( * ) Notice: Subject to any disclaimer, the term of this patent is extended or adjusted under 35 U.S.C. 154(b) by 2 days.

(21) Appl. No.: 10/955,715

(22) Filed: Sep. 30, 2004

(65) Prior Publication Data

US 2006/0066281 A1 Mar. 30, 2006

(51) Int. Cl.
*G01V 3/02* (2006.01)
*G05B 11/01* (2006.01)

(52) U.S. Cl. .................. 318/635; 318/254; 318/560; 360/77.06

(58) Field of Classification Search ............... 318/459, 318/500, 599, 635, 254, 811, 560, 569, 439; 360/294, 294.5, 266.4, 77.08
See application file for complete search history.

(56) References Cited

U.S. PATENT DOCUMENTS

| | | | |
|---|---|---|---|
| 5,708,337 A * | 1/1998 | Breit et al. ................. | 318/439 |
| 5,768,045 A * | 6/1998 | Patton et al. ............. | 360/78.04 |
| 6,040,671 A | 3/2000 | Brito et al. | |
| 6,072,666 A | 6/2000 | Sonderegger et al. | |
| 6,108,157 A | 8/2000 | Yoneda et al. | |
| 6,301,082 B1 | 10/2001 | Sonderegger et al. | |
| 6,324,033 B1 | 11/2001 | Broom et al. | |
| 6,363,214 B1 * | 3/2002 | Merello et al. ............. | 318/109 |
| 6,373,650 B1 * | 4/2002 | Pedrazzini ................... | 360/75 |
| 6,396,652 B1 | 5/2002 | Kawachi et al. | |
| 6,512,650 B1 | 1/2003 | Tanner | |
| 6,542,324 B1 * | 4/2003 | Galbiati et al. ............... | 360/75 |
| 6,594,102 B1 | 7/2003 | Kanda et al. | |
| 6,667,843 B1 | 12/2003 | Norman et al. | |
| 6,690,536 B1 * | 2/2004 | Ryan ....................... | 360/78.04 |
| 6,717,765 B1 * | 4/2004 | Harmer ................... | 360/78.06 |
| 6,721,119 B1 | 4/2004 | Hassan et al. | |
| 6,765,746 B1 | 7/2004 | Kusumoto | |
| 6,771,480 B1 * | 8/2004 | Brito ......................... | 361/159 |
| 6,903,894 B1 * | 6/2005 | Kokami et al. .......... | 360/77.02 |
| 2001/0019463 A1 | 9/2001 | Drouin | |
| 2002/0079854 A1 * | 6/2002 | Kitamura et al. .......... | 318/459 |
| 2002/0163330 A1 * | 11/2002 | Sekiya ................... | 324/207.17 |
| 2004/0041530 A1 | 3/2004 | Peterson ..................... | 318/254 |
| 2005/0057844 A1 * | 3/2005 | Rote et al. .................... | 360/75 |
| 2005/0082996 A1 | 4/2005 | Luebbe ........................ | 318/268 |
| 2005/0127861 A1 * | 6/2005 | McMillan et al. .......... | 318/268 |

* cited by examiner

*Primary Examiner*—Paul Ip
(74) *Attorney, Agent, or Firm*—Kinney & Lange, P.A.

(57) ABSTRACT

A control apparatus controls retraction of a device carried on a moveable member actuated by an electric motor. The control apparatus includes a measuring circuit with an output during a measuring phase including a back electromotive force (back EMF) from the electric motor plus a measuring circuit offset voltage. The control apparatus also includes an offset removing circuit connected to the output of the measuring circuit. The back EMF from the electric motor is provided at the output of the offset removing circuit. A driver circuit is connected to terminals of the electric motor for providing the electric motor with a drive current during a driving phase with a magnitude based on the back EMF from the electric motor.

18 Claims, 2 Drawing Sheets

VELOCITY CONTROLLED DISK DRIVE HEAD RETRACTION WITH OFFSET REMOVAL

BACKGROUND OF THE INVENTION

The present invention relates to disk drives and storage medium devices. In particular, the present invention relates to removal of random offsets in velocity controlled hard disk drive head/arm assemblies during head retraction.

Generally, a magnetic hard disk drive (HDD) includes a magnetic read/write head and several magnetic disks, each disk having concentric data tracks for storing data. The disks are mounted on a spindle motor, which causes the disks to spin. The read/write head is typically mounted on a slider, which is mounted to a suspension or load beam. The load beam is attached to an actuator arm of an actuator, which moves the read/write head over the spinning disk during operation. As the disks spin, the slider suspended from the actuator arm "flies" a small distance above the disk surface. The slider carries a transducing head for reading from or writing to a data track on the disk.

In addition to the actuator arm, the slider suspension comprises a bearing about which the actuator arm pivots. A large scale actuator motor, such as a voice coil motor (VCM), is used to move the actuator arm (and the slider) over the surface of the disk. When actuated by the VCM, the actuator arm can be moved from an inner diameter to an outer diameter of the disk along an arc until the slider is positioned above a desired data track on the disk.

A control circuit is coupled to a coil in the VCM in order to controllably supply current to the coil. When a current is passed through the coil, a motive force is exerted on the actuator arm. The actuator arm is subjected to a force tending to accelerate the actuator arm at a rate defined by the magnitude of the current, and in a direction defined by the polarity of the current. Thus, in order to accelerate or decelerate the actuator arm until it is moving at a desired velocity and in a desired direction, it is important to know the actual direction and velocity of the actuator arm. It is known that the back electromotive force (back EMF) from the coil of the actuator is representative of the velocity and direction of movement of the actuator arm.

Parking zones in an HDD allow the read/write head to be safely landed after the hard drive has ceased operation. When an HDD is powered down, it usually performs certain operations before actually disconnecting from the external power source. One of these power down operations is to operate the actuator arm to move the head to the parking zone. If the head is not moved to the parking zone prior to power down, the head will land on the disk after the disk stops spinning, potentially damaging the disk and the read/write head.

Typically, the circuit that measures the velocity of retraction has random offsets that limit the ability of the circuit to accurately measure and control the speed of a retraction. This is especially true at low retraction speeds, where the offsets are more significant. Further, the offsets limit the reliability of stop detection methods due to random offsets in the velocity measurement. Thus, there is a need for an approach to eliminate random offsets that are found in circuits of velocity controlled HDD head/arm assemblies during retraction.

BRIEF SUMMARY OF THE INVENTION

The present invention is a control apparatus for controlling retraction of a device carried on a moveable member actuated by an electric motor. The control apparatus includes a measuring circuit having a sensed back electromotive force (back EMF) as its output during a measuring phase. The sensed back EMF includes an actual back EMF from the electric motor plus a measuring circuit offset voltage. The actual back EMF from the electric motor is related to a velocity of the moveable member. The control apparatus also includes an offset removing circuit connected to the output of the measuring circuit for determining and removing the measuring circuit offset voltage. The actual back EMF from the electric motor is provided at the output of the offset removing circuit. A driver circuit is connected to the electric motor for providing the electric motor with a drive current during a driving phase having a magnitude based on the actual back EMF from the electric motor. A controller is connected between the offset removing circuit and the driver circuit for alternately activating the measuring circuit during the measuring phase and the driver circuit during the driving phase.

In one embodiment, the offset removing circuit includes an offset sampling circuit for sampling and storing the measuring circuit offset voltage during the driving phase. The offset removing circuit also includes a subtracter for subtracting the measuring circuit offset voltage stored in the offset sampling circuit from the output of the measuring circuit during the measuring phase. In one embodiment, the offset sampling circuit includes storage means for storing the measuring circuit offset voltage, and delay means for holding the measuring circuit offset voltage in the storage means until the measuring phase and passing the measuring circuit offset voltage to the subtracter.

DETAILED DESCRIPTION

Figure 1:
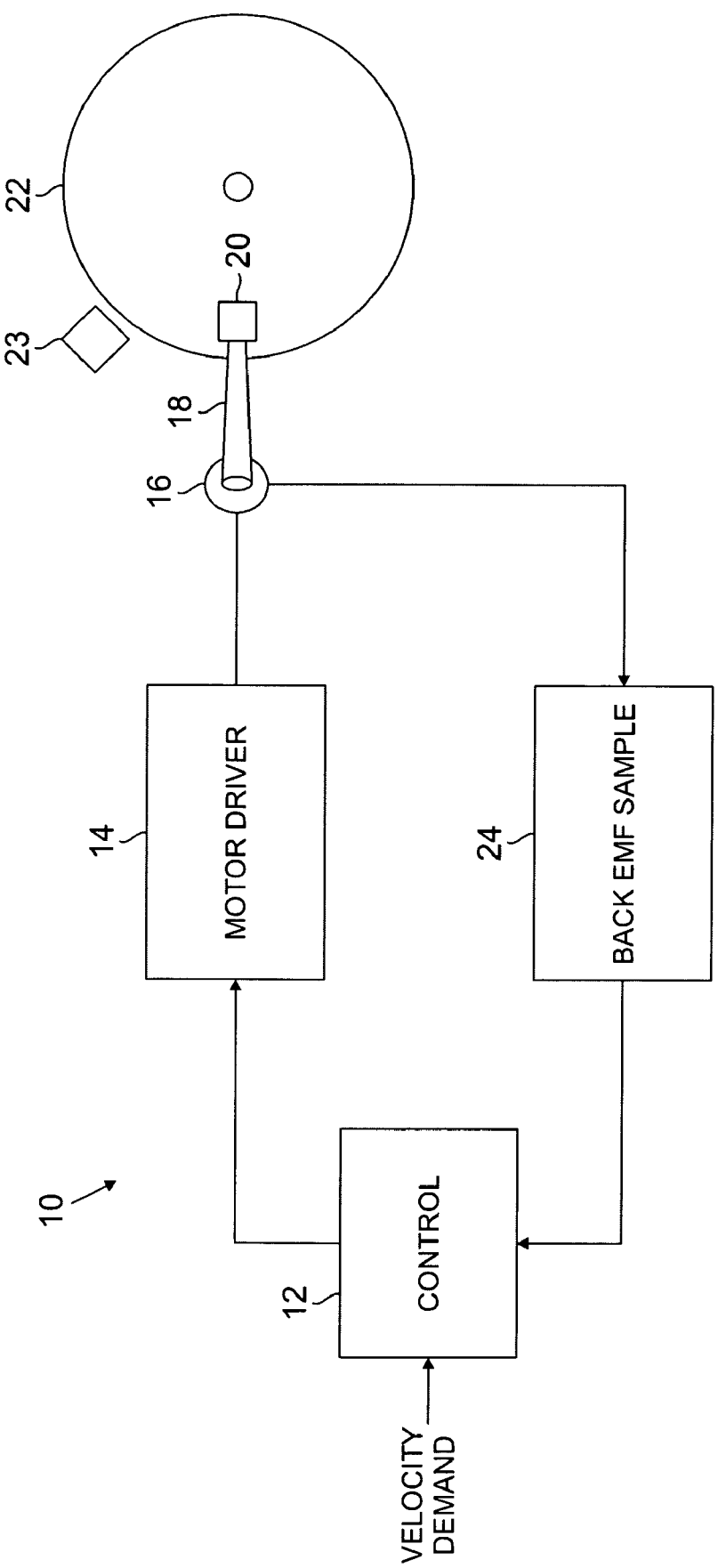
FIG. 1 is a block diagram of a typical velocity controlled disk drive head retraction control system.

FIG. 1 is a block diagram of typical velocity controlled disk drive head retraction control system 10. Disk drive head retraction control system 10 includes control block 12, motor driver block 14, motor 16, actuator arm 18, transducing head 20, disk 22, parking location 23, and back electromotive force (back EMF) sampling block 24. Control block 12 receives a velocity demand signal as an input and provides a control signal to motor driver block 14. Motor driver block 14 is connected to motor 16 and provides a drive current to motor 16 to move actuator arm 18. Back EMF sampling block 24 is connected to motor 16 to sample the back EMF from motor 16. Back EMF sampling block 24 provides a signal to control block 12.

In normal operation, a drive current is provided to motor 16 to actuate actuator arm 18. When actuated by motor 16, actuator arm 18 can be moved from an inner diameter to an outer diameter of disk 22 along an arc until transducing head 20 is positioned above a desired data track on disk 22. Disk 22 includes a plurality of concentric tracks on which data and position information is recorded. Disk 22 is mounted on a spindle motor, which causes disk 22 to spin. Transducing head 20 suspended from actuator arm 18 flies above the surface of disk 22 as it spins. Transducing head 20 is operable to read the data and position information from tracks of disk 22 and generate an input signal representative of the data and position information.

When a disk drive is powered down, it usually performs certain operations before actually disconnecting from the external power source. One of these power down operations is to operate actuator arm 18 to move transducing head 20 to parking location 23. Parking location 23 allows transducing head 20 to be safely landed after the disk drive has ceased operation. Parking location 23 is located at the outermost edge of disk 22 and typically includes a ramp to raise transducing head 20 and park it off of disk 22 in an elevated position. If the head is not moved to parking location 23 prior to power down, the head will land on disk 22 after disk 22 stops spinning, potentially damaging disk 22 and transducing head 20.

In the event of a catastrophic shut down (i.e., external power is suddenly removed), there is no external power to perform power down procedures, including moving transducing head 20 to parking location 23. Typically, the momentum of the spinning disk operates the spindle motor to generate a back electromotive force at the motor terminals, which is rectified and stored to provide power to disk drive head retraction control system 10 upon a catastrophic shut down. However, the power available to power motor 16 is limited by the spindle motor resistance and the back electromotive force of the spindle motor.

Disk drive head retraction control system 10 is a typical implementation of a system to retract transducing head 20 in a catastrophic power loss situation. Control system 10 alternately drives motor 16 with a drive current during a driving phase and measures the back EMF from the motor 16 during a measuring phase. The back EMF from motor 16 is representative of the velocity and direction of movement of actuator arm 18.

During the driving phase, control block 12 receives a velocity demand signal representing a preferred retraction velocity and direction of transducing head 20. The velocity demand signal is typically a programmable value stored in a register or other storage device. The torque load encountered by transducing head 20 as it traverses its path in a retract operation varies considerably with position. Consequently, control block 12 must constantly adjust the drive current to transducing head 20 to correspond to the velocity demand signal. Control block 12 provides a signal to motor driver block 14 corresponding to the drive current necessary to adjust the actual velocity of the transducing head 20 to correspond to the preferred velocity of the velocity demand signal. Motor driver block 14 amplifies this signal and drives motor 16 with a drive current to accelerate or decelerate retraction of transducing head 20 toward parking location 23.

During the measuring phase, the drive current to motor 16 is disabled. Subsequently, the back EMF from motor 16 is sampled by back EMF sample block 24. Preferably, the back EMF from motor 16 is sampled a plurality of times during the measuring phase and averaged to provide an average back EMF signal. The back EMF signal is then amplified by back EMF sample block 24 and passed to control block 12. This signal represents the actual velocity of transducing head 20. Control block 12 then uses the sampled back EMF signal to compare the actual velocity of transducing head 20 with the preferred velocity of the velocity demand signal. The driving phase then begins again as control block 12 provides a signal to motor driver block 14 corresponding to the drive current necessary to adjust the velocity of transducing head 20 to correspond to the preferred velocity of the velocity demand signal.

In conventional systems, the circuit that measures the velocity of retraction (in particular, back EMF sample block 24) has random offsets that limit the ability of the circuit to accurately measure and control the speed of a retraction. This is especially true at low retraction speeds, where the offsets are more significant. Further, the offsets limit the reliability of stop detection methods due to random offsets in the velocity measurement. Thus, there is a need for an approach to eliminate random offsets that are found in circuits of velocity controlled disk drive head retraction systems.

Figure 2:
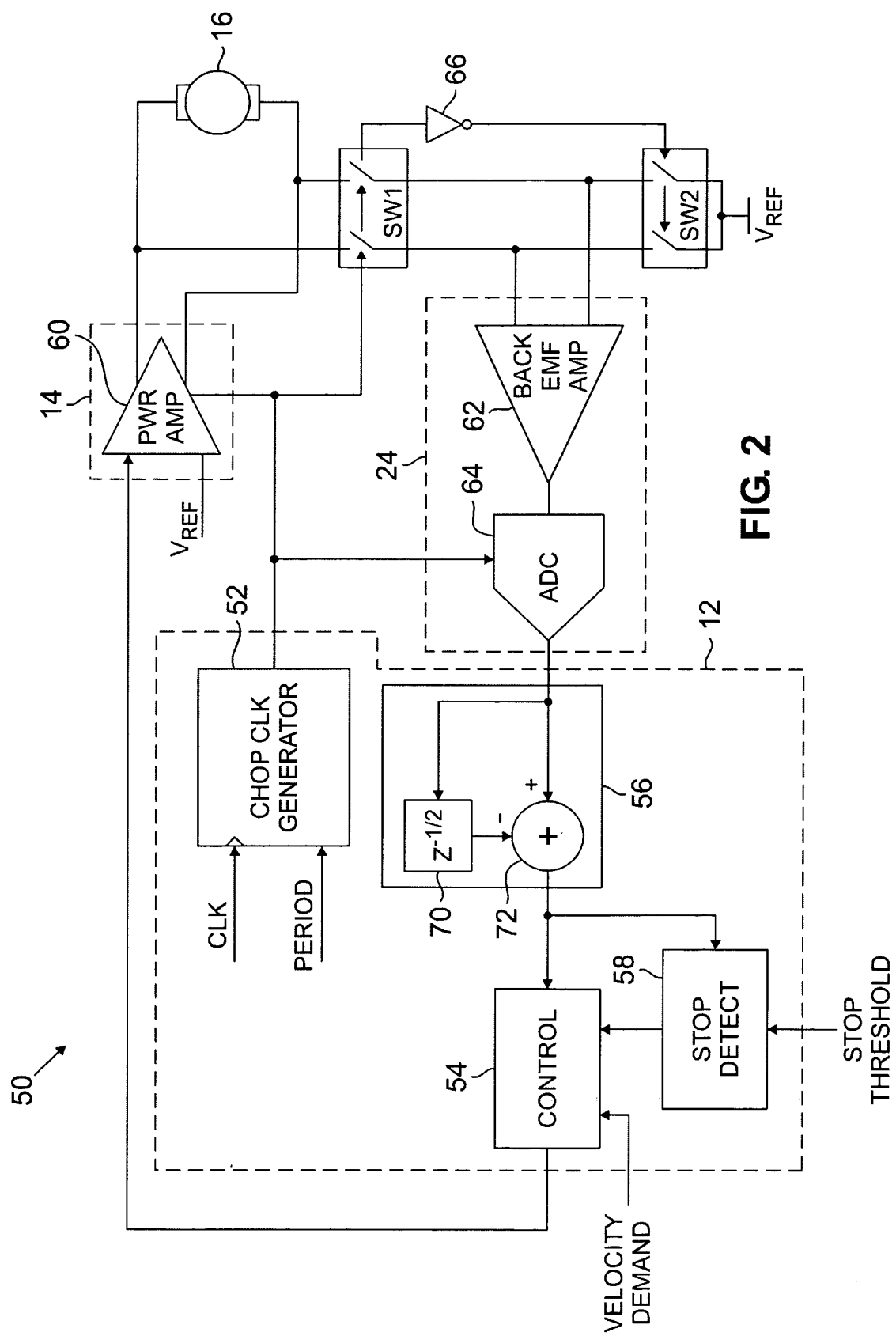
FIG. 2 is a schematic diagram of a velocity controlled disk drive head retraction control system with offset removal according to the present invention.

FIG. 2 is a schematic diagram of velocity controlled disk drive head retraction control system 50 with offset removal according to an embodiment of the present invention. Retraction control system 50 includes the same functional blocks as shown and described with regard to FIG. 1, including control block 12, motor driver block 14, motor 16, and back EMF sample block 24. Each of these blocks is shown in more detail in FIG. 2. Control block 12 includes chop clock generator circuit 52, control circuit 54, offset removing circuit 56, and stop detect circuit 58. Motor driver block 14 includes power amplifier circuit 60. One input of power amplifier circuit 60 is connected to an output of control circuit 54, while a second input of power amplifier circuit 60 is connected to a reference voltage $V_{REF}$. Double pole switches SW1 and the outputs of power amplifier circuit 60 are connected across motor 16. Back EMF sample block 24 includes back EMF amplifier 62 and analog-to-digital converter (ADC) 64. The inputs of back EMF amplifier 62 are connected between double pole switches SW1 and double pole switches SW2. Reference voltage $V_{REF}$ is provided across double pole switches SW2. The output of back EMF amplifier 62 is provided to the input of ADC 64. The output of ADC 64 is provided to offset removing circuit 56, and the output of offset removing circuit 56 is provided to control circuit 54 and stop detect circuit 58.

In operation, retraction control system 50 alternates between a driving phase and a measuring phase to control retraction of transducing head 20 (FIG. 1). Chop clock generator 52 controls alternating between the driving phase and the measuring phase in retraction control system 50. Chop clock generator 52 preferably produces a signal that comprises a recurring rectangular or square wave. In one embodiment, chop clock generator 52 produces a signal that has a constant frequency. The output of chop clock generator 52 is connected to the tri-state input of power amplifier circuit 60, to the enabling input of ADC 64, and to double pole switches SW1 and via inverter 66 to double pole switches SW2. Power amplifier circuit 60 is enabled when its tri-state input is low and ADC 64 is enabled when its enabling input is high. Thus, when the output of chop clock generator 52 transitions to the low state of the rectangular wave, power amplifier circuit 60 is enabled, ADC 64 is disabled, and the driving phase commences. Conversely, when the output of chop clock generator 52 transitions to the high state of the rectangular wave, ADC 64 is enabled, power amplifier circuit 60 is disabled, and the measuring phase commences.

During the driving phase, control circuit 54 receives a velocity demand signal representing a preferred retraction velocity and direction. Control circuit 54 subsequently provides a signal to power amplifier circuit 60 corresponding to the drive current necessary to adjust the actual velocity of the transducing head to coincide with the preferred velocity of the velocity demand signal. Power amplifier circuit 60 amplifies this signal and drives motor 16 with a drive current to accelerate or decelerate retraction of transducing head 20.

When motor 16 is being driven (i.e., when the output of chop clock generator 52 is low), double pole switches SW1 are both open and double pole switches SW2 are both closed. This puts back EMF amplifier 62 in common mode since $V_{REF}$ is on both inputs of back EMF amplifier 62. In one embodiment, the value of $V_{REF}$ is equal to the common mode at the output of power amplifier circuit 60 to minimize effects of common mode rejection on back EMF amplifier 62. When both inputs of back EMF amplifier 62 are at the same voltage, a back EMF amplifier offset voltage is provided at the output of back EMF amplifier 62. This analog signal is then provided to ADC 64, which converts the analog back EMF amplifier offset voltage to a digital signal. This conversion also adds an ADC offset voltage to the back EMF amplifier offset voltage. The sum of these offset voltages (hereafter referred to as the back EMF sample block offset voltage) is provided to offset removing circuit 56.

Offset removing circuit 56 includes offset sampling circuit 70 and subtracter 72. The back EMF sample block offset voltage from back EMF sample block 24 is provided to offset sampling circuit 70. In one embodiment, offset sampling circuit 70 averages a plurality of back EMF sample block offset voltage values during each driving phase to improve the accuracy of the back EMF sample block offset voltage measurement. This measurement is then stored in offset sampling circuit 70 and delayed until the measuring phase commences (e.g., for a half-cycle of retraction control system 50, as indicated by the $Z^{-1/2}$ label on offset sampling circuit 70). Offset sampling circuit 70 may include any circuit configuration that can store the back EMF sample block offset voltage measurement and delay providing this measurement at its output until the measuring phase.

During the measuring phase, the drive current to motor 16 is disabled, double pole switches SW1 are both closed, and double pole switches SW2 are both open. This places the inputs of back EMF amplifier 62 across motor 16. The back EMF from motor 16 is subsequently sampled and amplified by back EMF amplifier 62. In one embodiment, multiple back EMF measurements are taken and averaged during each measuring phase to improve the accuracy of the back EMF measurement. The output of back EMF amplifier 62 is the amplified back EMF signal plus the back EMF amplifier offset voltage. This analog signal is then provided to ADC 64 to produce a digital representation of the back EMF measurement. The resulting signal is a digital representation of the actual back EMF signal plus the back EMF amplifier offset voltage and the ADC offset voltage (i.e., the amplified back EMF signal plus the back EMF sample block offset voltage). This signal is then passed to offset removing circuit 56.

Offset removing circuit 56 provides the actual back EMF signal plus the back EMF sample block offset voltage to subtracter 72. Subtracter 72 then subtracts the back EMF sample block offset voltage stored in offset sampling circuit 70 from this signal. The output of subtracter 72 is the actual back EMF signal, which represents the actual velocity of transducing head 20. Because this subtraction is performed digitally, there will be no error introduced by the subtraction. At very low head retraction velocities, the offset from back EMF sample circuit 24 can be significant compared to the actual back EMF from motor 16. By removing the back EMF sample block offset voltage by digital subtraction, an accurate measurement of the back EMF from motor 16 is achieved.

Control circuit 54 then uses the actual back EMF signal to compare the actual velocity of transducing head 20 with the preferred velocity of the velocity demand signal. In one embodiment, control circuit 54 includes a digital implementation of a proportional integral (PI) controller to perform this operation. The driving phase then begins again as control circuit 54 provides a signal to power amplifier 60 corresponding to the drive current necessary to adjust the velocity of transducing head 20 to coincide with the preferred velocity of the velocity demand signal.

Disk drive head retraction control system 50 further includes stop detect circuit 58. Stop detect circuit 58 includes as its inputs a stop threshold signal and the output of offset removing circuit 56. In one embodiment, the stop threshold signal is provided by a programmable register and designates the back EMF threshold that motor 16 must reach to indicate that transducing head 20 has reached parking space 23 (see FIG. 1). That is, as transducing head 20 is retracted onto parking space 23, the back EMF from motor 16 will decrease as the torque load on transducing head 20 increases when it approaches and reaches parking space 23. As a result, the threshold back EMF is programmed to coincide with the back EMF from motor 16 when it reaches parking space 23. In one embodiment, the back EMF from motor 16 must stay at or below the threshold back EMF for a programmable number of chop clock cycles to indicate that transducing head 20 has reached parking space 23. Because the offset voltage from back EMF sample block 24 is removed prior to being provided to stop detect circuit 58, the accuracy of the stop detection is enhanced, since only the actual back EMF from the motor is provided to stop detect circuit 58.

In summary, conventional control circuits for controlling the velocity of retraction of a transducing head have random offsets that limit the accuracy and range of speeds of a retraction that can be measured and controlled. This is especially true at low retraction speeds, where the offsets are more significant. Further, the offsets limit the ability of the circuit to accurately measure and control the speed of a retraction. The present invention is a control apparatus for controlling retraction of a device carried on a moveable member actuated by an electric motor. An exemplary application of the present invention is a velocity controlled retraction of a transducing head in a disk drive system after a catastrophic shut down. The control apparatus includes a measuring circuit having an output during a measuring phase that includes a back electromotive force (back EMF) from the electric motor plus a measuring circuit offset voltage. The control apparatus also includes an offset removing circuit connected to the output of the measuring circuit for determining and removing the measuring circuit offset voltage. The back EMF from the electric motor is provided at the output of the offset removing circuit. A driver circuit is connected to terminals of the electric motor for providing the electric motor with a drive current during a driving phase. The magnitude of the drive current is based on the back EMF from the electric motor. The control apparatus also includes a controller for alternately calculating the velocity of the moveable member based on the back EMF from the electric motor and controlling the magnitude of the drive current provided by the drive circuit based on the velocity of the moveable member.

Although the present invention has been described with reference to preferred embodiments, workers skilled in the art will recognize that changes may be made in form and detail without departing from the spirit and scope of the invention. Particularly, while some forms of the invention are described in the form of discrete devices, it is recognized that the circuit is preferably reduced to practice in the form of an integrated circuit (IC). Therefore, terms such as "device" and the like should be construed in their broadest contexts to include portions of ICs that are conveniently described as functional components, as well as discrete devices. Likewise, some forms of the invention are described in terms of logic gates and chips that could also be implemented by discrete devices, all within the scope and spirit of the present invention.

The invention claimed is:

1. A control apparatus for controlling retraction of a transducing head from the surface of a recordable medium, the transducing head carried on a movable member actuated by an electric motor, the control apparatus comprising:
a measuring circuit having a sensed back electromotive force (back EMF) as its output during a measuring phase, the sensed back EMF including an actual back EMF from the electric motor plus a measuring circuit offset voltage, wherein the actual back EMF from the electric motor is related to a velocity of the moveable member;
an offset removing circuit connected to the output of the measuring circuit for determining and removing the measuring circuit offset voltage and providing the actual back EMF from the electric motor at its output;
a driver circuit connected to the electric motor for providing the electric motor with a drive current during a driving phase having a magnitude based on the actual back EMF from the electric motor; and
a controller connected between the offset removing circuit and the driver circuit for alternately activating the measuring circuit during the measuring phase and the driver circuit during the driving phase,
wherein the offset removing circuit comprises an offset sampling circuit for sampling and storing the measuring circuit offset voltage during the driving phase, and a subtracter for subtracting the measuring circuit offset voltage stored in the offset sampling circuit from the sensed back EMF during the measuring phase.

2. The control apparatus of claim 1, wherein the offset sampling circuit comprises:
storage means for storing the measuring circuit offset voltage; and
delay means for holding the measuring circuit offset voltage in the storage means until the measuring phase and passing the measuring circuit offset voltage to the subtracter during the measuring phase.

3. The control apparatus of claim 1, wherein the offset sampling circuit averages a plurality of measuring circuit offset voltage values during each driving phase to determine the measuring circuit offset voltage.

4. The control apparatus of claim 1, wherein the measuring circuit averages a plurality of sensed back EMF values during each measuring phase to determine the sensed back EMF.

5. The control apparatus of claim 1, wherein the controller calculates the velocity of the moveable member based on the actual back EMF from the electric motor during the measuring phase and controls the magnitude of the drive current provided by the drive circuit based on the velocity of the moveable member during the driving phase.

6. The control apparatus of claim 1, and further comprising:
a stop detect circuit for determining whether the back EMF from the electric motor has reached a threshold electromotive force (EMF), the threshold EMF indicating that the transducing head is fully retracted.

7. The control apparatus of claim 1, wherein the control apparatus is fabricated in an integrated circuit.

8. The control apparatus of claim 1, wherein the electric motor is a voice coil motor.

9. A method of controlling retraction of a device carried on a moveable member actuated by an electric motor after a sudden power loss, the method comprising:
sampling a back electromotive force (back EMF) from the electric motor during a measuring phase, wherein sampling the back EMF adds a measuring circuit offset to the actual back EMF to yield a sensed back EMF;
determining the measuring circuit offset;
subtracting the measuring circuit offset from the sensed back EMF; and
driving the electric motor with a drive current during a driving phase having a magnitude based on the actual back EMF,
wherein determining the measuring circuit offset comprises sampling the measuring circuit offset during the driving phase immediately prior to the measuring phase and storing the measuring circuit offset until the measuring phase.

10. The method of claim 9, wherein sampling the measuring circuit offset during the driving phase comprises averaging a plurality of measuring circuit offset values during each driving phase to determine the measuring circuit offset.

11. The method of claim 9, wherein sampling the back EMF during the measuring phase comprises averaging a plurality of back EMF values during each measuring phase to determine the back EMF.

12. The method of claim 9, and further comprising:
alternating between the measuring phase and the driving phase.

13. The method of claim 9, and further comprising:
calculating the velocity of the moveable member based on the actual back EMF from the electric motor during the measuring phase.

14. The method of claim 9, and further comprising:
determining whether the actual back EMF from the electric motor has reached a threshold electromotive force (EMF) during the measuring phase, the threshold EMF indicating that the device is fully retracted.

15. The method of claim 14, and further comprising:
terminating retraction of the device when the actual back EMF from the electric motor remains below the threshold EMF for a programmable number of measuring phases.

16. A method of controlling retraction of a read/write head in a magnetic disk drive system of the type having a moveable member actuated by an electric motor in order to effect the retraction, the method comprising:
sampling a measuring circuit offset voltage during a driving phase;
storing the measuring circuit offset voltage;
sampling the back electromotive force (back EMF) from the electric motor during a measuring phase; and
determining an adjusted value of the back EMF by subtracting the measuring circuit offset voltage from the sampled back EMF voltage.

17. The method of claim 16 and further comprising:
driving the electric motor with a drive current having a magnitude based on the adjusted value of the back EMF voltage during the driving phase.

18. The method of claim 16, wherein sampling the back EMF from the motor comprises averaging a plurality of back EMF values to determine the back EMF.

* * * * *